United States Patent [19]
Tomlinson

[11] 3,820,038
[45] June 25, 1974

[54] METHOD AND APPARATUS FOR PRODUCING ISOLATED LASER PULSES HAVING A FAST RISE TIME

[75] Inventor: Richard G. Tomlinson, Glastonbury, Conn.

[73] Assignee: The United States of America as represented by the United States Atomic Energy Commission, Washington, D.C.

[22] Filed: Feb. 9, 1973

[21] Appl. No.: 331,150

[52] U.S. Cl. .......................................... 331/94.5 Q
[51] Int. Cl. ............................................... H01s 3/11
[58] Field of Search .................................... 331/94.5

[56] References Cited
UNITED STATES PATENTS
3,521,069  7/1970  De Maria et al .................. 331/94.5
3,626,326  12/1971  Wuerker ........................... 331/94.5

Primary Examiner—William L. Sikes
Attorney, Agent, or Firm—John A. Horan; Leonard Belkin; C. Daniel Cornish

[57] ABSTRACT

Disclosed herein is a laser oscillator system which provides laser pulses having a characteristically short rise time and high energy content. A laser oscillator is Q-switched to produce short duration pulses of radiation and a small amount of each pulse is tapped off to trigger a spark gap discharge in an electro-optic modulator. A pair of polarizing elements and the modulator are located along the axis of the optical cavity in the oscillator. With selective activation of the modulator, the polarizer elements interrupt the resonant reflections of the optical flux between the mirrors defining the oscillator and the Q-switched pulse energy is rapidly dumped from the cavity as fast rise time pulses.

6 Claims, 6 Drawing Figures

Q-SWITCHED PULSE

Q-SWITCHED PULSE
INTERRUPTED BY
CAVITY DUMP

CAVITY DUMPED PULSE

CAVITY DUMPED
SHAPED PULSE

METHOD AND APPARATUS FOR PRODUCING ISOLATED LASER PULSES HAVING A FAST RISE TIME

This invention was made in the course of or under a contract with the U.S. Atomic Energy Commission.

BACKGROUND OF THE INVENTION

The production of pulses of laser energy by cavity dumping a laser oscillator has been disclosed in such publications as A. H. Vuylsteke, Journal of Applied Physics, 34, 1615–1622, June 1963; W. R. Hook et al., Applied Physics Letters, 9, 125–127, August 1966; J. Ernest et al., Physics Letters, 22, 147–149, August 1966; and D. G. Carlson, Proceedings of the IEEE, 57, 807–808, May 1969. These articles describe the operation of a laser oscillator in which a high density optical flux is established within a resonant cavity before the flux is quickly switched out of the cavity. The system is very efficient since the rapid switching of the optical flux is the equivalent of removing one of the mirrors which defines the resonant cavity and therefore the long extraction time and losses normally associated with draining laser energy from a resonator by transmission through a partially reflecting mirror are eliminated.

The Carlson publication describes the technique in which a gain medium is positioned in a resonant optical cavity formed by a pair of mirrors and an electro-optical modulator sandwiched between two polarizers is located along the axis of the cavity. In operation, the polarizers are aligned with one another and when the gain medium is suitably pumped, the cavity oscillates. The optical flux is allowed to build up in the resonator and at an appropriate point a fast rise time electrical pulse is applied to the modulator, the voltage of the pulse being sufficient to cause a 90° rotation of the plane of polarization of the optical energy passing through the modulator. Since the direction of polarization for the optical energy is mismatched with respect to the principal axis of the polarizers, the optical energy cannot pass through the polarizers and is dumped or switched out of the optical cavity.

A characteristic of the pulses of laser energy produced by the technique described above which has limited the utility of these pulses is the relatively slow rise time of the switched out pulses. In various applications such as the irradiation of particulate matter with pulses of laser energy to produce intense plasmas, laser pulses produced by the technique described by Carlson have been found inadequate.

SUMMARY OF THE INVENTION

A primary object of the present invention is to provide isolated pulses of laser energy which have a rise time that is faster than any comparable rise time available with electronic switching means.

Another object is to provide fast rise time pulses of laser energy having shaped intensity profile.

According to the present invention a pair of polarizers and an electro-optic modulator are located along the optical axis of a resonant laser cavity to permit Q-switching and cavity dumping of the radiant energy produced in the laser oscillator: the cavity is Q-switched by pumping the gain medium and suitably rotating the plane of polarization of the optical flux passing through the electro-optic modulator; a sample of the Q-switched pulse provides a time synchronized burst of energy which triggers a spark gap to rapidly short circuit the voltage on the electro-optic modulator thereby effectively removing one of the mirrors defining the resonant cavity, and causes the optical energy to be dumped as a short duration, fast rise time, high power pulse of laser radiation.

In a preferred embodiment of the present invention, a portion of energy removed from the Q-switched pulse to trigger the spark gap of the electro-optic modulator is removed through a partially transmitting mirror which forms one end of the optical cavity. In an alternate embodiment, a beam splitter is located along the optical axis of the cavity and reflects a suitable amount of the Q-switched pulse out of the resonator.

A main feature of the present invention is the fast rise time of the output pulse of optical energy which is a result of the method of rapidly removing the voltage from the electro-optic modulator. In addition, a laser pulse having a duration less than the round trip time for light in the cavity can be produced with an energy content comparable to that attainable by Q-switching the oscillator cavity; the energy content is at least one to two orders of magnitude greater than the energy content in a single pulse from the same oscillator operated as a mode locked device. Also, the isolated pulses have an energy content which is a substantial percentage of the energy represented by the total population inversion in the gain medium in the oscillator. The present invention is characterized further in that the system produces output pulses which may be either along the optical axis of the oscillator or in a direction which forms an angle with the axis of the oscillator.

One advantage of utilizing the apparatus and techniques disclosed in the present invention is the availability of isolated pulses of laser energy which have a rise time that is faster than the rise time of laser pulses which can be produced by electronic switching techniques. Also, the present invention provides a versatile laser pulse generator in which the duration of the output pulses for a given oscillator configuration can be varied by changing the relative positions of the polarizer and electro-optic modulator within the cavity design. Further, the range of the duration variation can be changed considerably by suitably altering the length of the laser oscillator. An additional advantage of the present invention is its ability to produce highly intense plasmas through the interaction of pulses of laser radiation which are fast rise time, high energy pulses with small bodies of suspended particulate matter.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 5 is a simplified schematic illustration of an alternate embodiment of the present invention.

DESCRIPTION OF PREFERRED EMBODIMENTS

Figure 1:
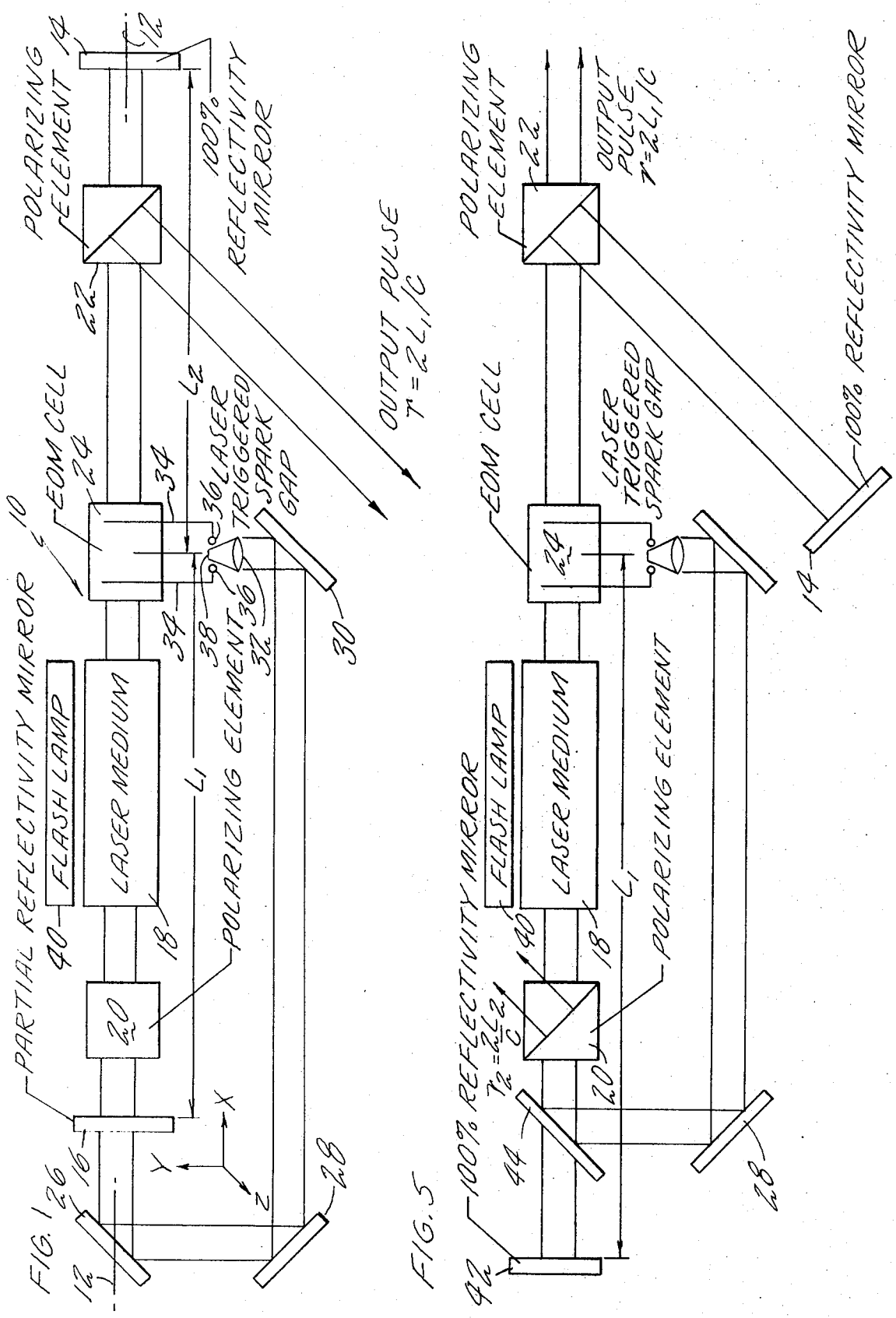
FIG. 1 is a simplified schematic illustration of a preferred embodiment of the present invention.

A description of one preferred embodiment of the present invention follows with reference to FIG. 1. A laser oscillator cavity 10 having an axis 12 and an overall length of $L_1$ plus $L_2$ is formed between a completely reflective mirror 14 and a mirror 16 which is partly transmissive of the laser energy from the oscillator. A laser gain medium 18 such as neodymium-glass, a first polarizing element 20, a second polarizing element 22 and an electro-optic modulator (EOM) cell 24 are positioned internal of the oscillator cavity along the optical axis. Corner mirrors 26, 28 and 30 form an optical path between the optical centerline of the oscillator and a focusing lens 32. The EOM which is separated from the partially transmissive mirror by distance $L_1$ is shown with a pair of electrical connectors 34 which form a spark gap 36 between a pair of terminals 38; a suitable gas under pressure fills the spark gap region. A flash lamp 40 is located adjacent to the laser gain medium.

The polarizing elements 20, 22 are crossed, that is, the first polarizing element will have essentially a one hundred percent transmission for laser energy polarized in the vertical (Y) direction and the second polarizing element will have essentially a 100 percent transmission for laser light polarized in the horizontal (Z) direction. Initially there is no voltage applied to the EOM and therefore when the gain medium is pumped with the flash lamp to produce a population inversion suitable for producing laser energy in the oscillator, the crossed polarizers block the passage of the laser energy to the mirrors and thereby prevent oscillation, allowing a high degree of inversion in the gain medium.

Figure 2:
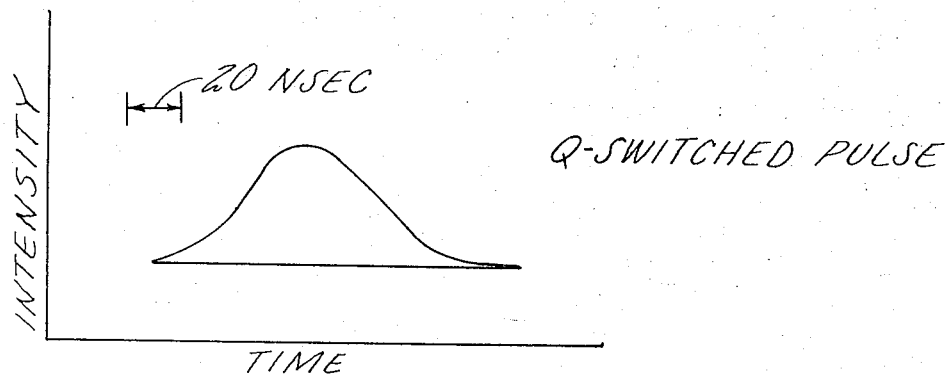
FIG. 2 is a plot illustrating the intensity versus time characteristic for a typical Q-switched pulse of laser energy produced with an apparatus such as shown in FIG. 1.

At an appropriate time a voltage is applied to the EOM to rotate the linearly polarized laser energy passing therethrough by 90°. The rotation allows the laser energy to oscillate between the mirrors 14, 16 and a laser pulse containing high energy is produced in what is commonly referred to as a Q-switching operation. A typical Q-switched pulse which would pass through the mirror 16 produced in the above-described manner is shown in FIG. 2.

Figure 3:
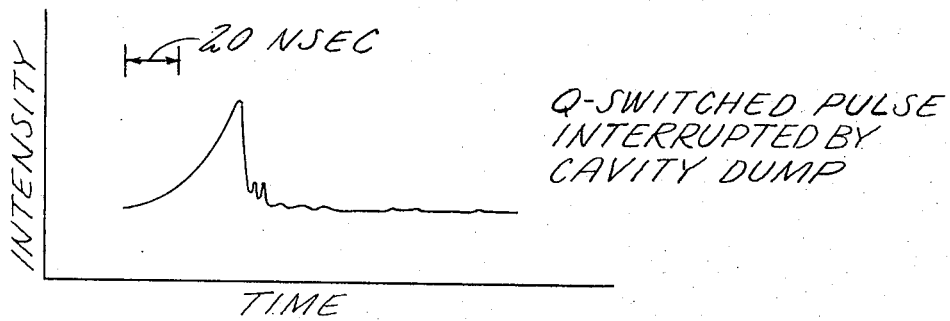
FIG. 3 is a plot illustrating the intensity versus time characteristic for a Q-switched pulse which has been terminated by the cavity dumping technique in accordance with the present invention.

The essence of the present invention involves a unique cavity dumping technique for terminating the Q-switched pulses which otherwise pass through the partially transmissive mirror. When the voltage across the EOM, which allows the laser energy to oscillate in the cavity notwithstanding the misaligned polarizing elements, is quickly short circuited before all of the available energy in the gain medium has been removed as a Q-switched pulse, the oscillator loses its resonant characteristics, and the remainder of the energy in the cavity is reflected out of the oscillator cavity at the polarizing elements. A high energy pulse which is also the longer duration pulse is directed out of the cavity at the second polarizing element as shown in FIG. 1. Similarly, a lower energy shorter duration pulse is directed out of the cavity by the first polarizing element in a direction orthogonal to the previously described pulse and does not appear in FIG. 1. The EOM is controlled by an electrical circuit and has a spark gap connected across its input terminals. Therefore, when laser energy of sufficient intensity is focused on the spark gap, a plasma is formed which short circuits the terminals of the EOM. The plasma or spark produce the extremely fast change in voltage across the EOM. Under these conditions, the Q-switched pulse which passes through the mirror 16 with a typical profile as shown in FIG. 2 is modified to a terminated Q-switched pulse having a typical profile as is shown in FIG. 3. The laser energy which short circuits the spark gap 36 is produced by bleeding off a portion of the Q-switched pulse through the partially transmitting mirror and directing it into the spark gap region with the fully reflecting mirrors 26, 28 and 30 through a focusing lens 32 as is shown in FIG. 1.

As soon as the EOM is deenergized by creating the gas breakdown in the spark gap between the electrodes 38, the polarizing elements interrupt the resonant condition of the cavity; this condition prevents all of the available energy from being removed as a Q-switched pulse as would otherwise happen if the EOM were continually energized. The net result is that the difference between the Q-switched pulse terminated by cavity dumping as shown in FIG. 3 and the typical Q-switched pulse as shown in FIG. 2 appears as two separate laser pulses, one being emitted from each of the polarizers. The duration of the pulse emitted by the second polarizing element ($\tau_2$) is $2L_1/C$ and the duration of the laser pulse emitted at the first polarizing element ($\tau_1$) is $2L_2/C$; these pulses are orthogonally polarized with respect to each other.

Figure 4:
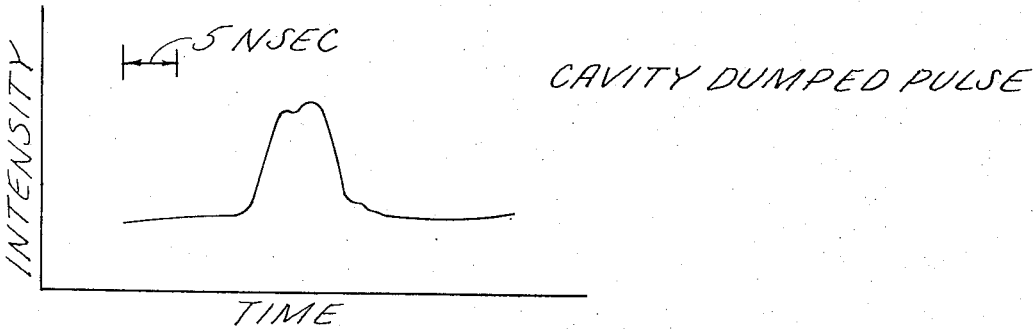
FIG. 4 is a plot illustrating the intensity versus time characteristic for an output pulse produced by cavity dumping a laser oscillator such as the one shown in FIG. 1.

The rise times of the pulses $\tau_1$ and $\tau_2$ are determined by the quickness with which the voltage is removed from the EOM and this in turn is directly a function of the inductance of the spark gap which should be made as low as possible for the purpose of producing the fast rise time, cavity dumped pulses. The technique described above has been used to produce pulses having durations measured in nanoseconds as is shown typically in FIG. 4 and more significantly with a rise time which is shorter than any produced with apparatus in which electronic circuitry is used to remove the voltage from the EOM device.

The relative duration and in turn the energy content of the two pulses produced with the present invention in the manner described above can be varied by relocating the EOM with respect to the mirrors 14, 16. As a practical matter this device is used primarily to produce one high energy, fast rise time, output pulse although in some instances the shorter duration low power pulse produced is also utilized. The EOM can be any device such as a Kerr or Pockels cell which will rotate the plane of polarization in response to a voltage as described.

In addition, the duration of both the main output pulse and the secondary output pulse can be varied over a wider range than is available by simply relocating the EOM in a given laser oscillator, by changing the overall length of the laser oscillator.

The optical flux from the laser oscillator which is required to trigger the spark gap and short circuit the EOM can be adjusted relatively simply by changing the length of the spark gap, the gas pressure maintained between the electrodes, the focusing lens or the amount of laser energy relayed to the spark gap.

An alternate embodiment of the present invention is shown in FIG. 5; the primary distinctions over the previously described system are the replacement of the partially transmitting mirror 16 with a fully reflecting mirror 42, insertion of a beam splitter 44, elimination of the mirror 26, and relocation of the fully reflecting mirror 14 in the off-axis position as shown. The operation of this system is essentially as was previously described except that the polarizing elements are aligned. This embodiment is especially interesting for application in which the main cavity dumped pulse is desired along the axial direction of the oscillator.

Since the cavity dumping is delayed until the optical flux within the high Q cavity has reached some optimum level, and the laser energy is extracted during one round trip time, substantially all of the energy stored in the population inversion is extracted in the output pulse.

Figure 6:
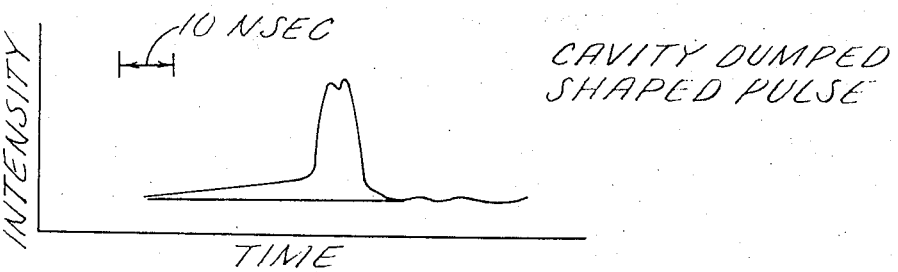
FIG. 6 is a plot illustrating the intensity versus time characteristic for a cavity dumped laser pulse in which prepulsed leakage is utilized to shape the intensity profile of the pulse.

One useful variation in the method of operating all embodiments of the present invention involves applying a lesser voltage to the EOM than is necessary to produce a 90° rotation in the plane of polarization of the laser energy in the cavity. Under this condition controlled amount of energy is switched from the oscillator prior to the main cavity dumping and the cavity dumped pulse can be shaped as is apparent from the intensity profile of the pulse shown in FIG. 6.

Although this invention has been shown and described with respect to preferred embodiments thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Pat. of the U.S. is:

1. Apparatus for producing fast rise time, high energy laser pulses comprising:
    a. means having mirrors for producing Q-switched pulses of laser energy from a linear laser oscillator capable of being operated as a mode locked device to produce round trip pulses between the mirrors in the oscillator and resulting output pulses, and which comprises:
    b. an optical cavity defining an optical axis between a first partially transmitting and partially reflecting mirror and a second fully reflecting mirror,
    c. a gain medium disposed along the axis between the mirrors,
    d. first polarizing means disposed in the optical cavity on the axis between the gain medium and the first mirror, for transmitting laser energy back and forth between said mirrors,
    e. second polarizing means disposed in the optical cavity on the axis between the gain medium and the second mirror for transmitting laser energy back and forth between said mirrors, and
    f. electro-optic modulation means disposed on the axis between the gain medium and the second polarizing means having:
    g. excitation terminals selectively carrying an excitation voltage that rotates the polarization direction of linearly polarized light passing therethrough 90°, said terminals removing the 90° rotation when short circuited;
    h. a gas filled spark gap between said excitation voltage terminals for short circuiting said excitation terminals for removing the 90° rotation for producing an output of laser energy in the cavity by reflection from said second polarizing means; and
    i. means for optically directing a sample of the Q-switched laser pulse energy in the oscillator through the first polarizing means and the first mirror in a direct path to the modulator means where the laser energy is concentrated in the form of a synchronized burst of energy in the spark gap to produce a plasma which short circuits the voltage on the terminals of the electro-optical modulation means and rapidly removes the excitation voltage of the modulator for producing a laser output pulse having a duration less than the round trip for pulses in the cavity and an energy content at least one to two orders of magnitude greater than the energy content of a single pulse from the oscillator when it is operated as a mode locked device.

2. The invention according to claim 1 wherein the first and second polarizing means are oriented so that each passes laser radiation which is linearly polarized in a direction which is 90° separated from the other.

3. The invention according to claim 1 wherein the first and second polarizing means are oriented so that each passes laser radiation which is linearly polarized in the same direction.

4. The invention according to claim 1 wherein the means for producing Q-switched pulses of laser energy includes further a beam splitter disposed on the axis between the first mirror and the first polarizing means.

5. The invention according to claim 1 wherein the first mirror is a partially transmitting mirror and the second mirror is a fully reflecting mirror.

6. The invention according to claim 5 wherein the optical cavity defines a straight line optical axis along which the output is varied by changing the relative positions of either one of the two polarizing means and the electro-optic modulation means within the cavity.

* * * * *